Patented Mar. 22, 1938

2,111,571

UNITED STATES PATENT OFFICE 2,111,571

DRY CLEANING LIQUID AND PROCESS OF MAKING SAME

Robert H. Price, Colorado Springs, Colo.

No Drawing. Application April 22, 1936, Serial No. 75,902

2 Claims. (Cl. 87—5)

The present invention relates to certain novel compositions for dry-cleaning fabrics, furs, leather goods and the like, without injuring the same in any manner, and to a process of preparing such materials.

This composition is a liquid, and can be made from the following ingredients, mixed in the relative proportions stated. For the purpose of illustration, I give an example of the preparation of one (1) gallon of the liquid, and the amounts of the liquid components are stated in fluid ounces, and the amounts of the solid components are stated in avoirdupois ounces.

53 ounces of benzol,
  32 ounces of Stoddard solvent,
  11 ounces of denatured alcohol, special formula,
  16 ounces of oleic acid
   3 ounces of amyl acetate
   2 ounces of castile soap (by weight)
   3 ounces of ammonia water of 28%
   8 ounces of pure water, preferably distilled water,
   ¼ ounce (by weight) of caustic potash.

The denatured alcohol preferably used is composed of 100 parts by volume of ethyl alcohol, 5 parts of wood alcohol, or other pure methyl alcohol, 5 parts of ethyl acetate, 1 part of aviation grade gasoline. This denatured alcohol may contain about 5% of water. The Stoddard solvent, is a known material in the dry-cleaning industry, being a petroleum distillate, substantially water-white, flash point not below 100° F., free from corrosion on copper strip for 3 hours at 212° F., substantially free from constituents boiling at below 300° F., about 50% distilling at 350° F., 95 to 98% distilling at 410° F. The distillate should be free from acid reaction, free from sourness by doctor solution, and should contain not substantially over 5% absorbable in sulphuric acid of 1.835 gravity. The benzol used is the purified article substantially free from color, gums, tars, and from other strong-smelling constituents, and is substantially water-white.

For making the composition, the components are preferably mixed in non-metallic containers or mixers. 13 ounces of the oleic acid are placed in a container to which is added 8 ounces of the denatured alcohol, the 3 ounces of amyl acetate, then the 32 ounces of Stoddard solvent, to which is finally added the 53 ounces of benzol. This liquid composition is then stirred for a short time, say a minute or so, or until the ingredients are thoroughly mixed. This first mixture is then set aside for a time, and into a second container, similar to the first, is placed the 8 ounces of pure or distilled water which is heated to 212° F., or the boiling point, to insure that the water is free from foreign matter, and is then permitted to cool to about 150° F., when the ¼ ounce of caustic potash is added and allowed to dissolve, then the 2 ounces of castile soap, which has first been finely chopped and ground to small particles, are added and the liquid stirred, for the soap to dissolve. This second compound is then poured into the container or mixer holding the first composition which is slowly stirred while the second mixture is being added and until the two liquids are thoroughly mixed. This combination of the two compounds has a white milky color. Into this last compound, while it is being vigorously stirred or agitated, is poured the 3 ounces of ammonia, which causes the solution to turn from a white milky color to a light amber color, and then the remaining 3 ounces of alcohol followed by the remaining 3 ounces of oleic acid are added which sets the mixture of a very light amber shade producing approximately one gallon of this new dry-cleaning composition or detergent.

One of the outstanding features of this detergent composition is its freedom from heavy oils. This feature requires less distilling and use of caustics to purify this detergent composition than other cleaning preparations and compounds. Constant purification of the ordinary cleaning preparations is required to free them from the heavy oils and the accompanying dirt and grease obtained through the use of these solutions in the cleaning process. This purification is secured by the use of modern Monel metal filters passing the solution through fine metal screens, and by distilling or use of caustics. If this is not done, garments upon being dried by heat are left with an offensive rancid odor. In using these Monel metal filters most of the cleaning solutions which contain heavy oils tend to clog the fine metal screens through which the solution is passed in filtering the same. The 8 ounces of distilled water contained in this detergent adds to its cleaning qualities and is so thoroughly blended and saponified with the other ingredients contained in said detergent that it can be used in a Monel metal filter without raising or increasing the normal pressure in said filter. This water content so thoroughly mixes and saponifies with the other ingredients contained in the formula that it does not leave a water stain on the garments and gives a sheen to the materials on which it is used. Another feature of this detergent for dry-cleaning is that this composition, which is a liquid, is pervious to water or moisture. This permits, in case a difficult or stubborn spot is encountered which still remains on the garment after having gone through the washer, that the affected area may be dampened or moistened with water and this detergent composition applied directly to the affected area which is then rinsed off. This avoids the necessity of a re-run through the washer or the use of other cleaning compounds or solutions.

In the appended claims, "parts" refers to parts by volume, in the case of liquids and corresponding parts by weight in the case of solids. Thus where liquids are measured in fluid ounces, the solids would be measured in avoirdupois ounces, or where the liquids are measured in pints, the solids would be measured in pounds, etc.

The proportions of the constituent substances are substantially critical in that if these proportions are not substantially followed (i. e. if proportions considerably different from those given above, are used) a satisfactory substantially clear composition will not be produced. It is accordingly stated that any large variation in the making of the applicant's product, from the substances used in the above table, will give only unsatisfactory results.

The order of adding the components is also very important, and if the materials are simply all dumped into a mixing receptacle, only an unsatisfactory product will be produced.

The above composition, as stated, is a clear liquid, usually of a light amber color. It is miscible in all proportions with dry-cleaners' gasoline, Stoddard solvent and the like. It can be used "full strength" for spotting and similar operations, and of course can be diluted with gasoline or Stoddard solvent for ordinary dry-cleaning operations.

I am aware that most of the substances given above, have been used in dry-cleaning, but not in the present relation.

I claim:—

1. A liquid composition for dry cleaning fabrics, furs and leather apparel and which is non-injurious thereto, consisting of—
   53 parts of benzol
   32 parts of Stoddard solvent
   11 parts of denatured alcohol
   3 parts of amyl acetate
   8 parts of distilled water
   2 parts of castile soap together with the reaction products of
   16 parts of oleic acid
   3 parts of ammonia water 28%, and
   ¼ part of caustic potash,
said composition containing small amounts of methyl alcohol, ethyl acetate and light gasoline, which increase its solvent and detergent properties, said entire liquid composition being a substantially clear liquid having a light color, in which formula, the caustic potash and castile soap are given in parts by weight and the other components are given in parts by volume.

2. A process of preparing a dry-cleaning fluid which comprises mixing 13 parts of oleic acid, 8 parts of denatured alcohol, 3 parts of amyl acetate, 32 parts of Stoddard solvent and 53 parts of benzol, to form a liquid composition A, separately from the above, dissolving ¼ part of caustic potash in 8 parts of warm water and dissolving 2 parts of solid castile soap in said caustic potash solution to form a liquid B, incorporating the liquid composition A and the liquid B, in the proportions stated, adding, while the same is being vigorously agitated or stirred, 3 parts of strong ammonia water, a further 3 parts of denatured alcohol, and adding a further 3 parts of oleic acid to the above mixture, whereby a substantially clear mixture of said components is produced, in which formula, the caustic potash and castile soap are given in parts by weight and the other components are given in parts by volume.

ROBERT H. PRICE.